(12) United States Patent
Evevsky

(10) Patent No.: US 8,854,660 B2
(45) Date of Patent: Oct. 7, 2014

(54) VIRTUAL PRINT SHOP MANAGEMENT

(75) Inventor: Nick Evevsky, Webster, NY (US)

(73) Assignee: Ricoh Company, Ltd., Yokohama-shi (JP)

( * ) Notice: Subject to any disclaimer, the term of this patent is extended or adjusted under 35 U.S.C. 154(b) by 464 days.

(21) Appl. No.: 13/161,094

(22) Filed: Jun. 15, 2011

(65) Prior Publication Data

US 2012/0320408 A1   Dec. 20, 2012

(51) Int. Cl.
*G06F 3/12* (2006.01)

(52) U.S. Cl.
CPC .............. *G06F 3/1212* (2013.01); *G06F 3/126* (2013.01); *G06F 3/1272* (2013.01); *G06F 3/1282* (2013.01); *G06F 3/124* (2013.01); *G06F 3/1243* (2013.01); *G06F 3/1288* (2013.01); *G06F 3/1256* (2013.01); *G06F 3/1245* (2013.01); *G06F 3/1222* (2013.01)
USPC ........................................ 358/1.15; 358/1.13

(58) Field of Classification Search
CPC .... G06F 3/1243; G06F 3/1227; G06F 3/1245
See application file for complete search history.

(56) References Cited

U.S. PATENT DOCUMENTS

2009/0265394 A1 * 10/2009 Tsujiwaki ............... 707/203
2009/0313060 A1   12/2009 Evevsky

* cited by examiner

*Primary Examiner* — Saeid Ebrahimi Dehkordy
*Assistant Examiner* — Lennin Rodriguezgonzale
(74) *Attorney, Agent, or Firm* — Oblon, Spivak, McClelland, Maier & Neustadt, L.L.P.

(57) ABSTRACT

A method including: maintaining, at a server, a list of print shops that participate in an external workflow managed by the server; receiving, at the server through a network, an order for a variable data campaign defining a plurality of personalized items for end recipients, said order including text and graphics used in the variable data campaign, identifying information of the end recipients that each receive an item of the variable data campaign, and a mapping specification that specifies which graphics correspond to which text for each item of the variable data campaign; generating, at the server, using the mapping specification, the text and graphics received, and the identifying information of the end recipients, a master file for the items of the variable data campaign, wherein the master file includes, for each of the items, images formed of corresponding text and graphics paired together in accordance with the mapping specification for each of the end recipients of the variable data campaign; assigning, at the server, the variable data campaign to one or more of the print shops that participate in the external workflow; and providing, at the server, the one or more print shops with the master file.

19 Claims, 5 Drawing Sheets

VIRTUAL PRINT SHOP MANAGEMENT

TECHNOLOGICAL FIELD

The present disclosure relates to systems and methods for virtual print shop management.

BACKGROUND

In advertising marketing campaigns, printed materials are sent to end recipients. Print shops use data provided by their customers to create the printed materials. Print shops traditionally internalize most tasks involved in the processing of the data provided by the customers and the printing of the printed materials. The print shops may suffer from inefficiencies when performing tasks outside of their core business practice of operating printing presses and printers.

The printed materials for a given job are traditionally prepared by a single print shop. Print shops that do not possess all the equipment necessary to prepare the printed materials in the manner specified by the customer are not able to receive some jobs because they cannot perform all the operations necessary to complete the job.

Print shops may be provided with unsecured customer data that is utilized in the printing of the printed material. This may lead to situations where print shops compromise the security of their customer's proprietary data.

SUMMARY

A first exemplary embodiment pertains to a method including: maintaining, at a server, a list of print shops that participate in an external workflow managed by the server; receiving, at the server through a network, an order for a variable data campaign defining a plurality of personalized items for end recipients, the order including text and graphics used in the variable data campaign, identifying information of the end recipients that each receive an item of the variable data campaign, and a mapping specification that specifies which graphics correspond to which text for each item of the variable data campaign; storing, at the server, a database that includes the mapping specification, the text and graphics received, and the identifying information of the end recipients; generating, at the server, using the database, a master file for the items of the variable data campaign, wherein the master file includes, for each of the items, images formed of corresponding text and graphics paired together in accordance with the mapping specification for each of the end recipients of the variable data campaign; assigning, at the server, the variable data campaign to one or more of the print shops that participate in the external workflow; and providing, at the server, the one or more print shops with the master file.

Another exemplary embodiment pertains to non-transitory computer readable medium, encoded with instructions, which when executed by a computer causes the computer to implement the above-noted method.

Another exemplary embodiment pertains to an apparatus including: a memory that stores computer executable instructions; and a processor configured to execute the instructions in order to maintain a list of print shops that participate in an external workflow managed by the apparatus, receive an order for a variable data campaign defining a plurality of personalized items for end recipients, the order including text and graphics used in the variable data campaign, identifying information of the end recipients that each receive an item of the variable data campaign, and a mapping specification that specifies which graphics correspond to which text for each item of the variable data campaign, manage a database that includes the mapping specification, the text and graphics received, and the identifying information of the end recipients, generate using the database, a master file for the items of the variable data campaign, wherein the master file includes, for each of the items, images formed of corresponding text and graphics paired together in accordance with the mapping specification for each of the end recipients of the variable data campaign, assign the variable data campaign to one or more of the print shops that participate in the external workflow, and provide the one or more print shops with the master file.

BRIEF DESCRIPTION OF THE DRAWINGS

A more complete appreciation of the embodiments discussed herein and many of the attendant advantages thereof will be readily obtained as the same becomes better understood by reference to the following detailed description when considered in connection with the accompanying drawings, wherein.

DETAILED DESCRIPTION

Figure 1A:
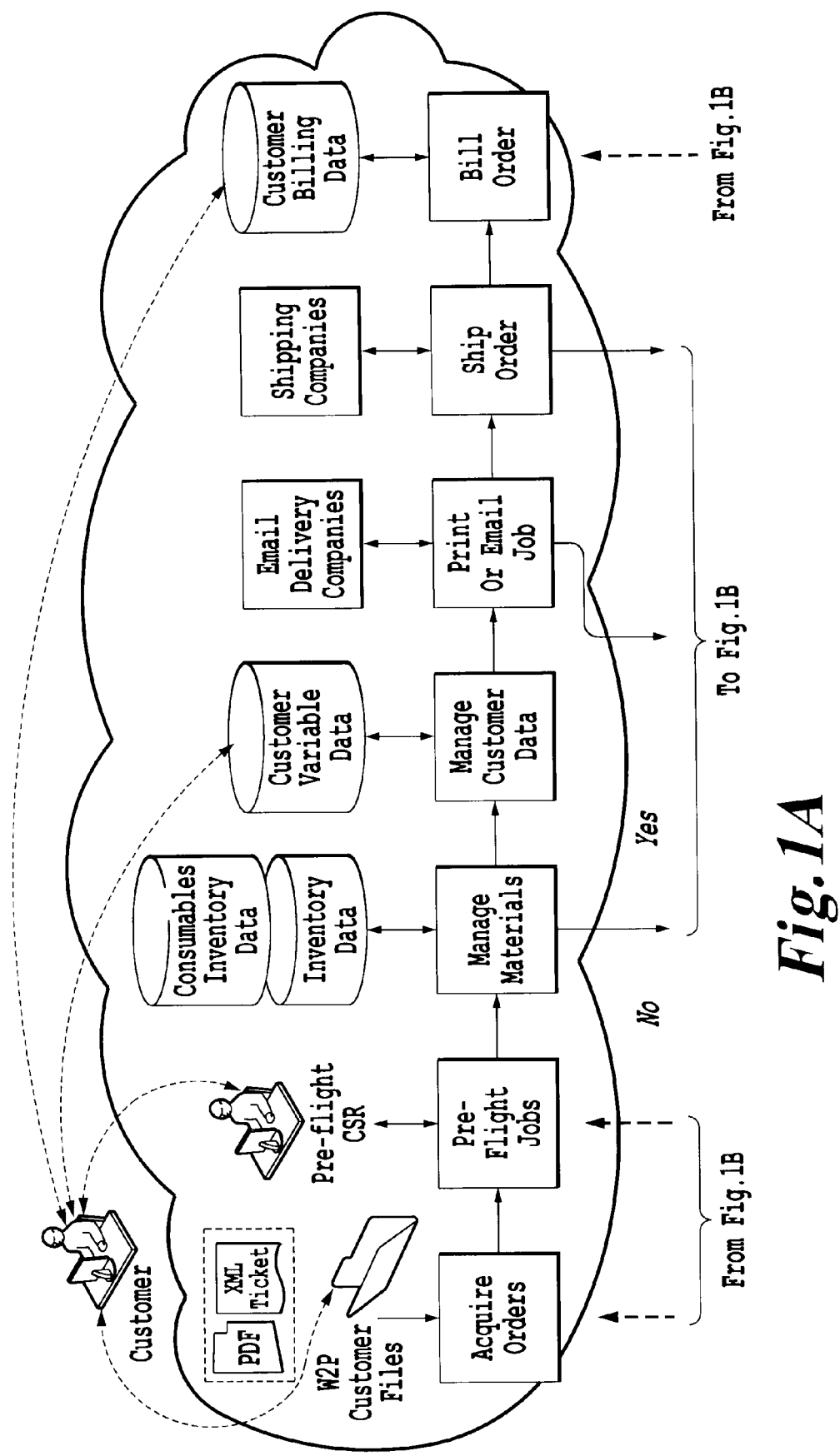
FIG. 1 illustrates an example of an external workflow for a print shop.

Referring now to the drawings, wherein like reference numerals designate identical or corresponding parts throughout the several views.

Exemplary embodiments discussed herein describe a business collaboration model for managing print shop services between multiple print shop businesses that supply fulfillment, print, and electronic media capabilities for their customers. A print shop is a printing company that prints the orders received from customers (i.e., print campaigns) using printers or that distributes electronic campaigns (i.e., by sending emails to email addresses provided by the customer). As discussed below, email is not the only form of electronic campaigns. Printers are the image forming apparatuses that are utilized by the print shops. Printers that may be used in a print shop include, but are not limited to, laser printers, printing presses, digital copiers, book making machines, facsimile machines, or a multifunction machine that performs print outputting function.

Each print shop may subscribe to an external workflow that contains optional process services to manage their individual print shop operations. Such optional services include preflight, inventory management, management of customer data, shipping, and billing. The plurality of print shops that subscribe to this external workflow may operate as a virtual print shop where orders are executed at the most efficient locations, determined by geographic proximity to the end destination, equipment capabilities, by cost, and/or by quality.

In the context of a virtual print shop, consistent branding, no matter where an item is physically printed, may be achieved by using consistent packaging and labeling (with consistent return addresses) for each order from all print shops. Consistent branding may also be accomplished by using the same colors, which results in the fulfilled order appearing the same no matter who fulfilled the order.

Customers and print shops register to use services provided by the server (i.e., to use or be part of the virtual print shop). An order is supplied to the system, wherein the order is uploaded by a customer or their proxy to a Web to Print (W2P) server. Software, such as Adobe Scene 7, may be used in conjunction with appropriate hardware (shown in FIG. 4 and discussed below) for providing the W2P server with the order. The W2P server may provide a dedicated online storefront for the virtual print shop which will capture all of the parameters for each item requested. This includes the paper or media type, size, and weight. Also captured are the ship to/from and payment information. Finally, the user will upload the print file(s) needed to create the order. The W2P server may be accessed via one or several web pages. Each print shop that participates in the virtual print shop may support its own web page or site that accepts orders. There is no requirement that only print shops support web pages for the virtual print shop. A physical print shop is not required to be part of the virtual print shop. Any entity may provide or support a web page that accepts orders for the virtual print shop. For example, sales personnel, whose only job is to solicit orders, may support a web page or site that accepts orders for the virtual print shop. This provides a form of virtual franchising, where the owner of the website can solicit print jobs using sales people or other forms of marketing, and then provide the orders to the virtual print shop where they are outsourced to one or more print shops for fulfillment.

A customer may be an advertising agency that creates individual mailers or electronic messages (i.e. emails or other messaging formats) to multiple, but separate, end-recipients. An advertising agency may include a customer with a comparatively small volume that produces media other than mail.

Figure 1B:
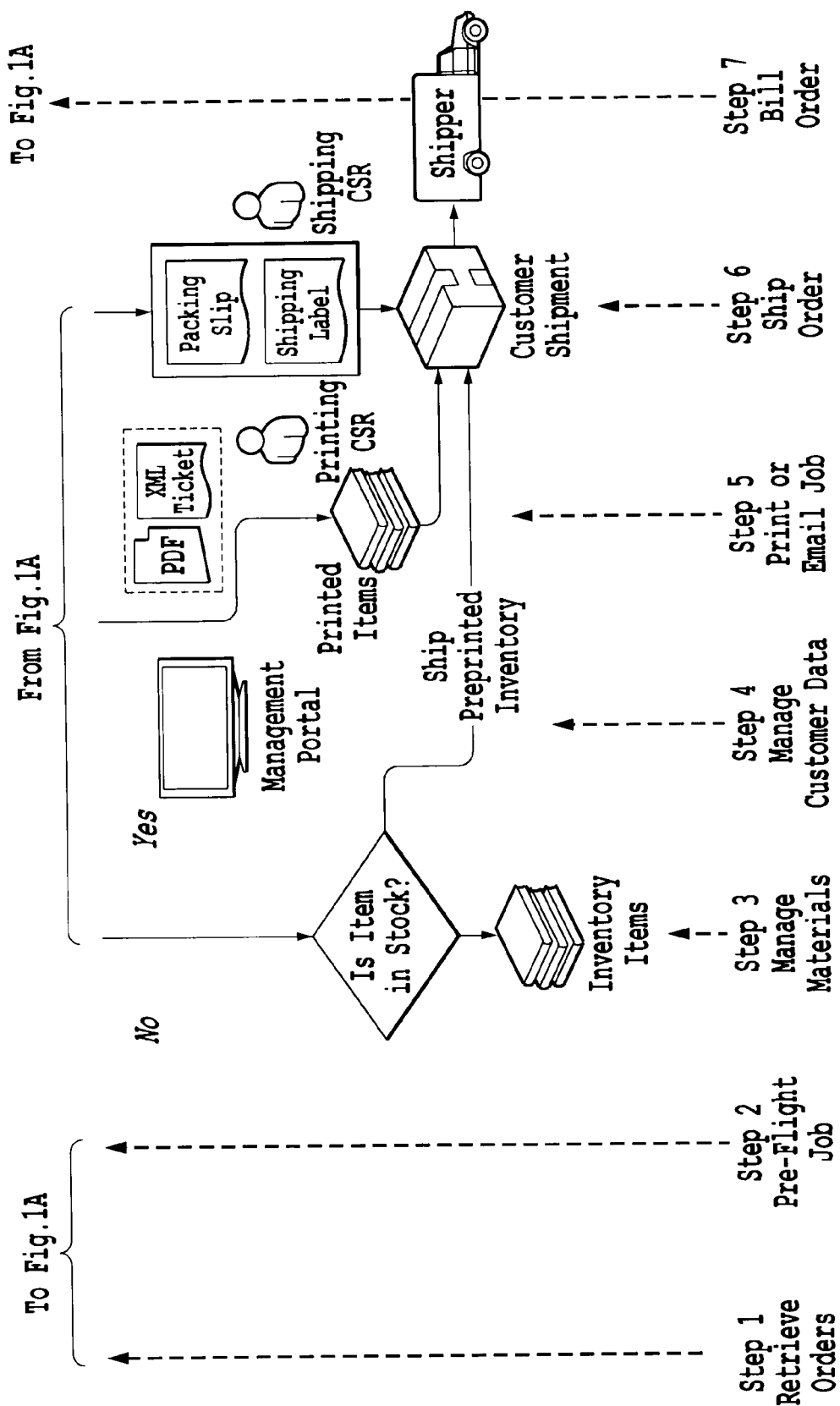

FIG. 1 illustrates an example of an external workflow for a print shop. Step 1 of the work flow involves retrieving orders. An order is supplied to the system, for example, when an entity (i.e., a Customer such as Advertising Agency or a salesman who has received an order or a print shop that has received an order) submits the order to be fulfilled. The server may maintain a list of customers or users and associated authentication data to authenticate the customers or users when they log onto the server through a user interface. The server may provide a user interface that enables the creation of accounts for new customers.

The order received may be for a campaign. A campaign as defined herein is a connected series of operations designed to bring about a particular result. More particularly, a campaign generally relates to the process of disseminating personalized information intended to persuade an end recipient of such information to take a particular action to acquire, purchase, lease, hire, or the like, the products and/or goods and/or services provided by a customer of the virtual print shop (i.e., the Advertising Agency). Such products, and/or goods and/or services may be in the form of samples thereof or notification of availability of services on a sample basis. As defined herein, reference to separate personalized campaign items refers to one campaign item out of the plurality of campaign items that, when considered as a group formed by the plurality of personalized campaign items are substantially similar to each other, but when considered individually are different from each other due to particular distinguishing differences related to the separate individuals forming the plurality of end recipients of the separate campaign item. FIGS. 9 and 10 of U.S. Patent Publication 2009/0313060 illustrate an exemplary campaign item. U.S. Patent Publication 2009/0313060 is incorporated herein by reference in its entirety.

Print shops that directly receive orders may upload them to the W2P server. Rather than fulfilling all orders that are placed at the print shop, the print shop has the ability to outsource all print shop orders to the virtual print shop. The print shop that receives the order may have an option to fulfill all or part of the order. The print shop may add the portion of the order they chose not to fulfill to the W2P server.

The ability to outsource print jobs using the virtual print shop advantageously allows physical print shops that participate in the virtual print shop to better accommodate unscheduled plant closings and planned holiday shutdowns. Moreover, an order (containing one or more jobs) may be processed by another print shop or shops for several reasons, including, but not limited to: another print shop is physically closer to the customer where shipping is resulting in overall faster and less expensive delivery and a smaller carbon footprint; the originating print shop does not have the capability or capacity to complete the order; or it is too expensive for the originating print shop to fulfill the order.

Step two of the workflow involves preflighting the job. The order or job is validated (i.e., preflighted) by the server. Preflighting is a term used in the printing industry to describe the process of confirming that the digital files required for the printing process are all present, valid, correctly formatted, and of the desired type. The process of preflighting a print job helps reduce the likelihood of problems that cause production delays. Software, such as PitStop by Enfocus, can be used to implement the preflight process. PitStop analyzes PDF files, but other print file formats may be used. Customer provided materials may be verified by a preflight operator for completeness and to confirm the incoming materials meet the production requirements. However, the efficiency of this process is improved when primarily conducted by a machine. The preflight process checks for:

images and graphics embedded by the client have been provided and are available to the application;
fonts are accessible to the system;
fonts are not corrupt;
fonts are in a compatible format;
image files are of formats that the application can process;
image files are of the correct color format;
image files are of the correct resolution;
required color profiles are included;
image files are not corrupt;
confirm that the page layout document size, margins, bleeds, marks and page information all fit within the constraints of the output device and match the client specifications;
confirm that the correct color separations or ink plates are being output;
removing non-printing data, such as non-printing objects, hidden objects, objects outside the printable area and objects on layers below;
flattening transparent objects into a single opaque object;
converting fonts to paths;
gathering embedded image and graphic files to one location accessible to the system; and
compressing files into an archive format.

This part of the process allows print shops to effectively outsource preflighting. If the PDF file passes preflight analysis, then the process is completely automated. If the PDF file fails preflight analysis, the PDF file is sent back to the customer. If the preflighting results in an indeterminate conclusion, a human technician or a virtual CSR (customer service representative) may be used to perform the preflight. Thus, the specialized task of preflight can be managed externally, with respect to the print shops, which allows employees of the print shop to focus on other tasks. This also provides for more predictable scheduling and less needed overtime.

Step 3 of the workflow involves managing materials/inventory. The server may manage inventory and materials of the individual print shops. Before assigning a job to a print shop, the server will determine the materials and equipment needed to complete the job, and compare this to the inventory on hand and the equipment on site of the various print shops that subscribe to the workflow. The server may only assign the job to a print shop or shops that have the required materials and equipment (i.e., has the capability or capacity to perform the job).

The server may manage a database, for each respective print shop, for inventory management. Data regarding the print shop's inventory and/or material usage may be supplied to the print shop in a real-time basis. Barcodes may be used to scan items as they are used, and this information may be relayed back to the server by the computer system onsite. Or, the server having been provided with the inventory levels of the print shop before hand, may decrease inventory levels based on the jobs assigned to the print shop and knowledge of the materials that must be used in the performance of the print job. The print shop may inform the server when inventory levels are replenished. The server may issue notifications to the print shops when inventory levels drop below a predetermined threshold, leaving it to the print shops to order additional materials. Alternatively, the server may automatically issue a purchase order on behalf of the print shops when inventory levels drop below a predetermined level.

Furthermore, this inventory management feature may be embodied as a just-in-time inventory management tool, wherein the print shops do not keep materials on-site (or keep only a limited amount of materials on-site). Rather, upon the assignment of a print job to a print shop that has the necessary equipment, the required materials will be directly shipped to the print shop. The server, upon assigning the print job, may also issue a command to a supplier with instructions to ship the required materials.

Step four of the workflow involves managing customer data. The advertising agency (i.e., customer) supplies, only to the server and not to the print shops, the specifications of what to print including the following data: database of delivery locations and corresponding mapping specification, the maximum campaign package price, the delivery date range within which the end-customers must receive their personalized mailing, and a list of any printing companies excluded from fulfilling the order. This is not an exhaustive list, and other information may be included. Furthermore, not all this information is necessary. If Advertising Agency is submitting an electronic campaign, then the Advertising Agency may supply email addresses of the recipients and corresponding mapping specifications.

The server provides for improved management of customer databases because all customer databases are managed and protected in a single place (i.e., databases are not shared with or accessed by the print shops). The customers may add, delete, and scrub their own database data from the server. The customers maintain ownership, access, and control over their databases.

The corresponding mapping specification is used in variable data campaigns (printed or electronic). The variable data campaign generates a plurality of items customized/personalized for each end recipient that are mailed or otherwise electronically delivered to their respective end recipient or electronic communications customized/personalized for each end recipient that is transmitted over a network to their respective end recipient (i.e., emails, instant messages, rss feed, or tweets). Variable data print jobs are described in U.S. Patent Publication 2009/0313060, previously incorporated by reference. Such variable data print jobs may involve printing mailers to people located in several different geographic areas. Multiple print shops may share this type of variable data print job, wherein a print shop only prints the mailers that are closest (i.e., same zip code, same city, same state, or sharing another geographic characteristic) to the print shop. Other print shops will print the remaining mailers. This processing is beneficial because the printer is physically closer to the customer where shipping is quicker/less expensive, and the amount of released carbon is less. Work can be directed to a combination of printers with the lowest effective carbon footprint giving the advantage to those shops that purchase carbon offsets and who are closest to a shipping destination.

Within a campaign, multiple possible combinations of graphics and text could be included within the campaign, e.g., graphics of different models of cars along with different messages. Document mapping is enabled by a database provided by the customer that specifies which graphics correspond to which text. The server, for a variable print job or email job, will use the mapping specification to create print or email masters in the form of a PDF file. The PDF file may include one image per page. At the print shop that receives the print or email master, a prepress operation may need to impose these images in a multiple fashion to the production media size. Alternatively, this prepress operation may be done at the server because the server knows the print capabilities of the print shop. In this case, the PDF master will have already gone through an imposition process of combining many pages into a single file.

Step 5 of the workflow involves printing the PDF master so the individual items may be mailed or dividing the PDF master into individual items so that the individual items may be transmitted through secure electronic means (i.e., email, Secure FTP transfer, web file upload). This involves distributing the print job to one or more print shops that subscribe to the workflow. This distribution may be accomplished in many different ways. The customer may select the print shop or shops to be used, or may exclude a print shop or shops from working on the job. The server may use a reverse auction to distribute the job. The print shop that uploaded the print job to the server may keep all or part of the print job. The use of a reverse auction to distribute print jobs is discussed in U.S. Patent Publication 2009/0313060, which was previously incorporated by reference. The server could also assign the print job to a print shop or shops based on their capabilities/equipment/quality level because the server knows the printing capabilities and inventory levels of the print shops that are part of the system.

Steps six and seven of the workflow involve shipping or distributing the order and billing. Print shops, in addition to receiving the above-noted PDF file for the job from the server, also receives a ticket. This ticket may include shipping and/or billing information. This ticket allows the shipping and/or billing information flow through the print shops internal systems without having to be rekeyed. For example, shipping information does not have to be reentered into a computer. Rather, a shipping label is generated remotely and printed locally at the print shop, the printed items for the job are boxed, and the shipping label is applied to the box. This also allows the server to store the shipping tracking information, which may be sent to the customer as discussed below in the close-out processing.

Pricing may be handled by the server. The server may possess detailed data to support different print shop pricing and costing models. This is achieved because the time and durations, and makes and models of equipment may be available to the server for each transaction. This allows the server to provide pricing estimates to customers.

After the order is shipped, other close-out processing for the order may include emailing the customer tracking information for the order, shipping confirmation, and/or coupon offers or discounts on future print jobs. The server, upon receiving confirmation that the order has shipped from the print shop, may perform the closeout processing.

The above-described system may allow partner print shops to engage in different levels of outsourcing collaboration. For example, all print shop orders may be outsourced, wherein the print shops route all orders into the system and they are processed by other partner print shops. This allows for accommodations to be made for unplanned plant closings and planned holiday shutdowns. A print shop's risk of surviving a natural disaster is decreased because their orders can be immediately redirected to available resources from other print shops. If a print shop is shutdown, for whatever reason, the print shop can notify the server and the server can reassign any pending print jobs to other print shops. In another example, an order (containing one or more jobs or units of work that must be performed) could be processed by a plurality of print shops. This may be done if the other print shops are physically close to the recipient where shipping is, resulting in overall faster and less expensive delivery and a smaller transaction carbon footprint. This may be done if the print shop that originated the order does not have the capability to complete the order, or it is too expensive for this particular print shop to complete the order. For example, it may be less expensive to outsource an order for business cards to a print shop that specializes in printing business cards.

Some print shops may want to route work to different print shops in order to minimize taxes. Taxes may be assessed if a print shop has a nexus with the taxing entity (i.e., state or municipality). Generally, a nexus is created for income tax purposes if an entity derives income from a source within the state or municipality, owns or leases property in the state or municipality, employs personnel in the state or municipality that exceed mere solicitation, or has capital or property in the state. Generally, a nexus is created for sales tax if a business has a physical location in the state or municipality, if there are resident employees working in the state or municipality, if the business has property (including intangible property) in the state or municipality, or if there are employees who regularly solicit business in the state or municipality. A nexus for state sales tax purposes has in the past required a physical presence of the taxing business in that state; more recently a nexus has been invoked in relation to affiliates. Some print shops or web sites that participate in the virtual print shop may forward jobs to a print shop that have the lowest effective total cost that includes: item cost+shipping cost+tax. While tax laws may change, items that are sold from an out of state business will tend to cost the customer less because their tax cost is generally zero.

The above-described system may be used to outsource individual steps involved in fulfilling an order. In some situations, a print shop may not have the capabilities or equipment to complete all the steps of an order. For example, the print shop may not have specific binding equipment that is required. In this scenario, an agreement is reached where the items are printed by the print shop and then bound and shipped at another print shop that has the necessary binding equipment.

Embodiments described herein may lower print shop cycle time. Cycle time variation is a proven metric and philosophy for continuous improvement with the aim of driving down the deviations in the time it takes to produce successive units on a production line. It supports organizations' application of lean manufacturing or lean production by eliminating wasteful expenditure of resources. It is distinguished from some of the more common applications by its different focus of creating a structure for progressively reducing the sources of internal variation that leads to workarounds and disruption causing these wastes to accumulate in the first place. Although it is often used as an indicator of lean progress, its use promotes a structured approach to reducing disruption that impacts efficiency, quality, and value. The print shop may focus on analytics that involve continuous iterative exploration and investigation of past performance to gain insight and drive planning. The server may track the performance of the various print shops by collecting analytics regarding quality, timeliness, cost, and customer feedback.

Furthermore, the system described above is flexible, and additional capabilities may be added dynamically when they become available to all print shops. Non-traditional services for print shops may be added to the system. For example, the server may provide print shops with a recycling help desk to support the print shops and their customers in finding recycling resources in their area. The system described in FIG. 1 may be monetized. There may be a charge to use the system or there maybe a monthly charge for membership. Also, since the server may know what hardware the job was printed on there could be a discount for use of particular equipment. For example, a discount may be provided for using equipment sold by the operator of the server.

Figure 2:
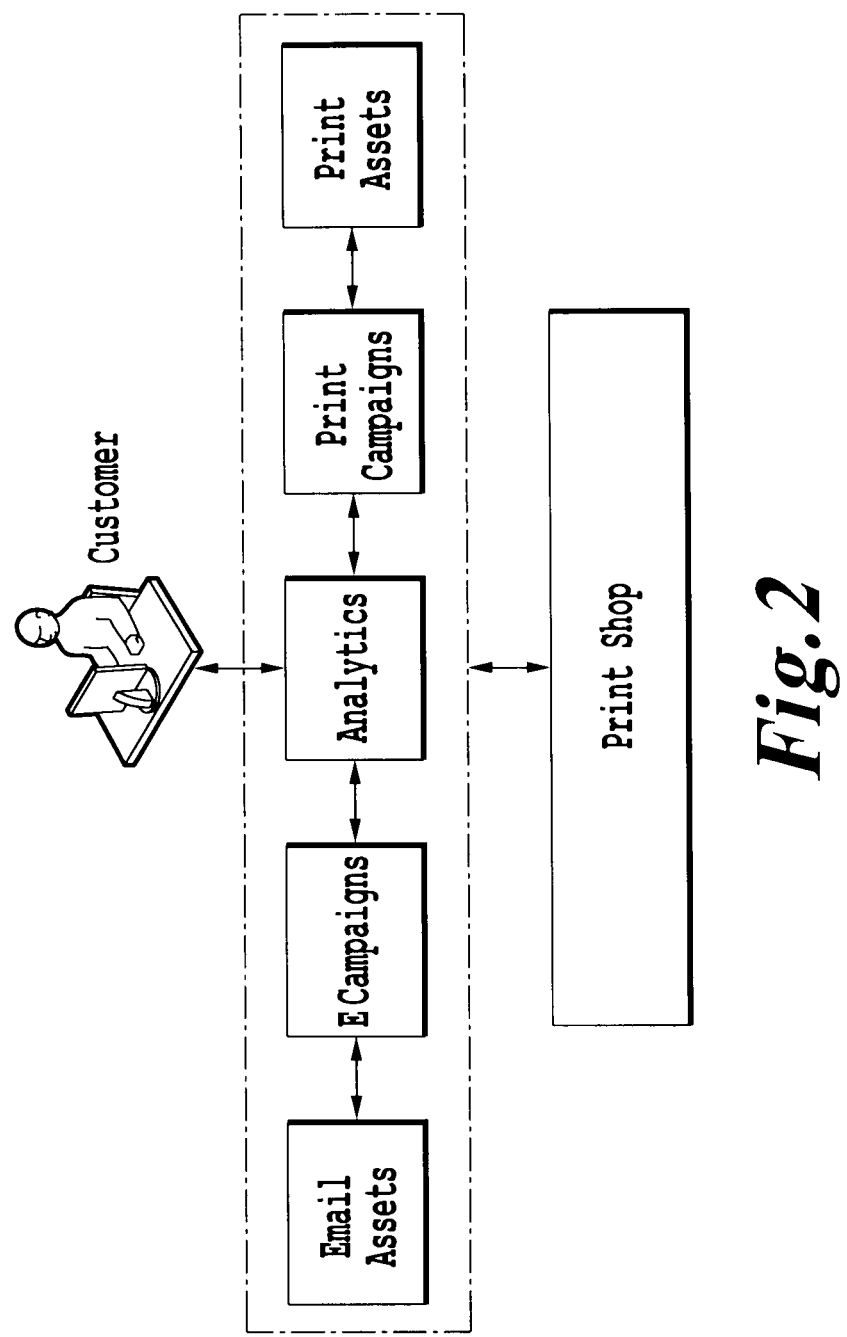
FIG. 2 illustrates a high level model of an embodiment that may include either print or electronic campaigns.

FIG. 2 illustrates a high level model of an embodiment that may include either print or electronic campaigns. While FIG. 2 includes email assets, email is not the only form of electronic campaign useable with the embodiments described herein. Electronic campaigns may utilize instant messaging (short message service (SMS) and/or multimedia messaging service (MMS)), social media such as Twitter or Facebook, or may be integrated into web pages.

FIG. 2 includes three tiers. The first tier represents the Customer, the Advertising Agency discussed above for example. The Customer is the owner of all the campaigns and assets. The server discussed above is the second tier in FIG. 2. The information for the campaigns and assets may be securely stored on the server as discussed above. The server may provide the campaign results and analytics (further discussed below) to the customer. The third tier represents the print shop where print campaigns are printed and/or electronic campaigns are executed.

The email assets are information that may include the following variables: email addresses, first/last name, mailing address, and IP address. Print assets are internet based addresses including, but not limited to, quick response (QR) codes, website addresses, email addresses, phone numbers, personal URLs, shortened URLS, and links to analytics tracking systems. A QR code (an example of which is shown in U.S. Pat. No. 6,267,296, the subject matter of which is incorporated by reference in its entirety) is a specific matrix barcode (or two-dimensional code), readable by dedicated QR barcode readers and camera phones. The code consists of black modules arranged in a square pattern on a white background. The information encoded can be text, URL or other data.

An Electronic campaign is an individual plan with a specific marketing goal. An electronic campaign may have the following components: text and/or HTML contents; specific list of people to email; information other than an email address, such as education level, salary/income, political affiliation, gender, age, occupation, ethnicity, geographic region in which they live, etc.; a predefined plan of one or more email messages and a timetable for the distribution of the email messages; and a measurable end recipient action that defines success of the campaign, such as the end recipient purchasing an item or viewing a webpage. Other electronic campaigns may involve web page addresses and unique identifiers used in social media websites.

A print campaign is an individual plan with a specific marketing goal. A print campaign may have the following components: a number of items to print and a print schedule defining a time when the entire campaign must be completed (i.e., mailed out); the variable print design; campaign specific URLs; campaign specific shortened URLs; one or more specific QR codes encoding the shortened URL; and a measurable end recipient action that defines success of the campaign, such as the end recipient accessing the QR code website or the end recipient performing a website action of making a purchase or signing up to a list. The shortened URL may be in the form of a bitly generated by http://bitly.

The server stores analytics that are collected from the actions of the end recipients. The server may directly accumulate the analytics or receive the analytics from other servers.

Analytics may include "hits" (defined as a single request for any item on a website), "impressions" (defined as a number of times an advertisement has been seen or heard), "page hits" (defined as a number of hits to pages), downloads, graphic hits (defined as a number of requests for images, animations or other graphics), unique requests, bandwidth usage on a website, unique user names, unique hosts (IP addresses of visitors), and visits per user. This list is just an example, and other analytics may be used.

When an end recipient of campaign uses a QR code that is, for example, printed on a mailer received by the end recipient, the end recipient may be taken to a website. The server may provide the Customer with the number of end recipients that accessed the website via the QR code. The analytics may additionally include the date and time the end recipient accessed the website. If the end recipient uses a camera phone with the QR code that includes GPS, the analytics may include the world location of the end recipient. The end recipient may have the option of controlling whether their location is included in the analytics. If the end recipient's camera phone does not include GPS (or GPS is not active), the analytics may include a world location based on relationship to a cell phone tower or towers. The analytics may additionally include whether the end recipient purchased an item or took some other defined action on the website. Other defined actions may include registering to receive messages (email, instant messages, or twitter messages), navigating to content, viewing content, clicking on an advertisement presented on the website, or clicking on a hyperlink displayed on the website.

The server, as part of the print or electronic campaign, may create a website or websites for the Customer. However, the server does not have to create the website. The server may partner with website owners or webmasters on existing websites. Any website address may be encoded into the QR code (i.e., a newly created website or a website existing prior to the beginning of the campaign) that is incorporated into the campaign. The server may obtain the QR by generating the QR code itself, or the QR code may be obtained from the customer. The webpage that the QR code directs to will include an invisible analytics tracking script that loads when the website page loads.

Analytics for a QR code may be collected using URL redirection (or URL forwarding). Other techniques may be used that make a webpage available under many different URLs. URL redirection may involve advertising the website destination to be <<www.mysite.com/campaign1>>. This website may be encoded in a QR code. When a web browser goes to this website, two things may occur: (1) the analytics information will be forwarded or saved locally and (2) the user will be forwarded to <<www.ricoh.com>>. URL shortening may be used for website redirection. A URL is registered, such as bit.ly/ricoh123 along with a destination address and the analytic information desired to be retained. Each time a user goes to bit.ly/ricohl 23 they will be redirected and the analytics will be stored at bit.ly. An advantage to using redirection or shortening is that the web destination and analytics settings can be modified without modifying the website contents or QR code design.

The access logs of the servers hosting web pages may keep detailed information about where visitors came from and how they browsed the hosted site. The server can determine which QR code was used to access a website. Analytic measurements and reporting may be managed by external systems such as Google Analytics. The server may manage the external analytics system manually or automatically through web serve methods. The server may create a customer account, may create/manage a campaign for the customer using a QR code, and may retrieve campaign analytics.

The server, having controlled the printing of the campaign, can determine upon which item the QR code was printed. This information may be stored in a database that creates a profile or profiles of the people the items of the campaign bearing the QR code (print or electronic) were sent to along with the analytics collected by the server. This database or database report may then be provided to the Customer. The profile may use the data the customer uploaded to the server about the end recipients of the items of the campaign along with the website analytics.

Figure 3:
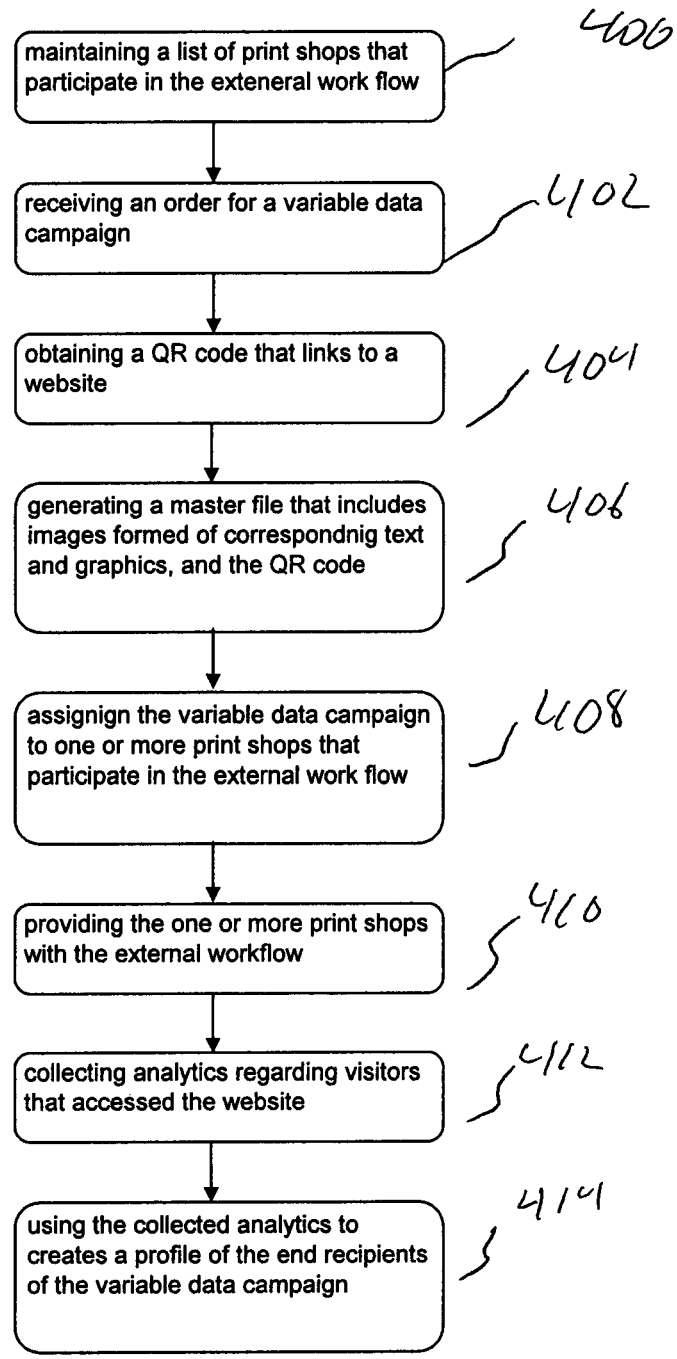
FIG. 3 is a flow chart that illustrates an embodiment described herein.

FIG. 3 illustrates an exemplary method that may be performed by the server discussed above with respect to FIG. 1. In step 400, the method includes maintaining a list of print shops that participate in an external workflow managed by the server. In step 402, the method includes receiving an order for a variable data campaign defining a plurality of personalized items for end recipients, the order including text and graphics used in the variable data campaign, identifying information of the end recipients that each receive an item of the variable data campaign, and a mapping specification that specifies which graphics correspond to which text for each item of the variable data campaign. In step 404, the method includes obtaining a QR code that links to a website. The QR code may be generated by the server performing this step, or may be supplied from the customer. In step 406, the method includes generating, using the mapping specification, the text and graphics received, and the identifying information of the end recipients, a master file for the items of the variable data campaign, wherein the master file includes, for each of the items, images formed of corresponding text and graphics paired together in accordance with the mapping specification for each of the end recipients of the variable data campaign. The generating of the master file may include adding the QR code to the master file. Each item of the campaign may include an identical QR code (i.e., link to the same website), each item may have a unique QR code (i.e., that links to a unique website), or some items may have a common QR code while others in the same campaign are different. In step 408, the method includes assigning the variable data campaign to one or more of the print shops that participate in the external workflow. In step 410, the method includes providing the one or more print shops with the master file. In step 412, the method includes collecting analytics regarding visitors that accessed the website by using the QR code. Part of the collecting of the analytics may involve in response to receiving a request from a user at the server for the website, redirecting the user to another website. In step 414, the method includes using the website analytics and the data the customer provided to create a profile about the end-recipients of the campaign items and sending it to the customer.

While the virtual print shop discussed in FIGS. 1-3 pertains to fulfilling a variable data campaign, the virtual print shop may operate with static campaigns, such as printing a static brochure.

Figure 4:
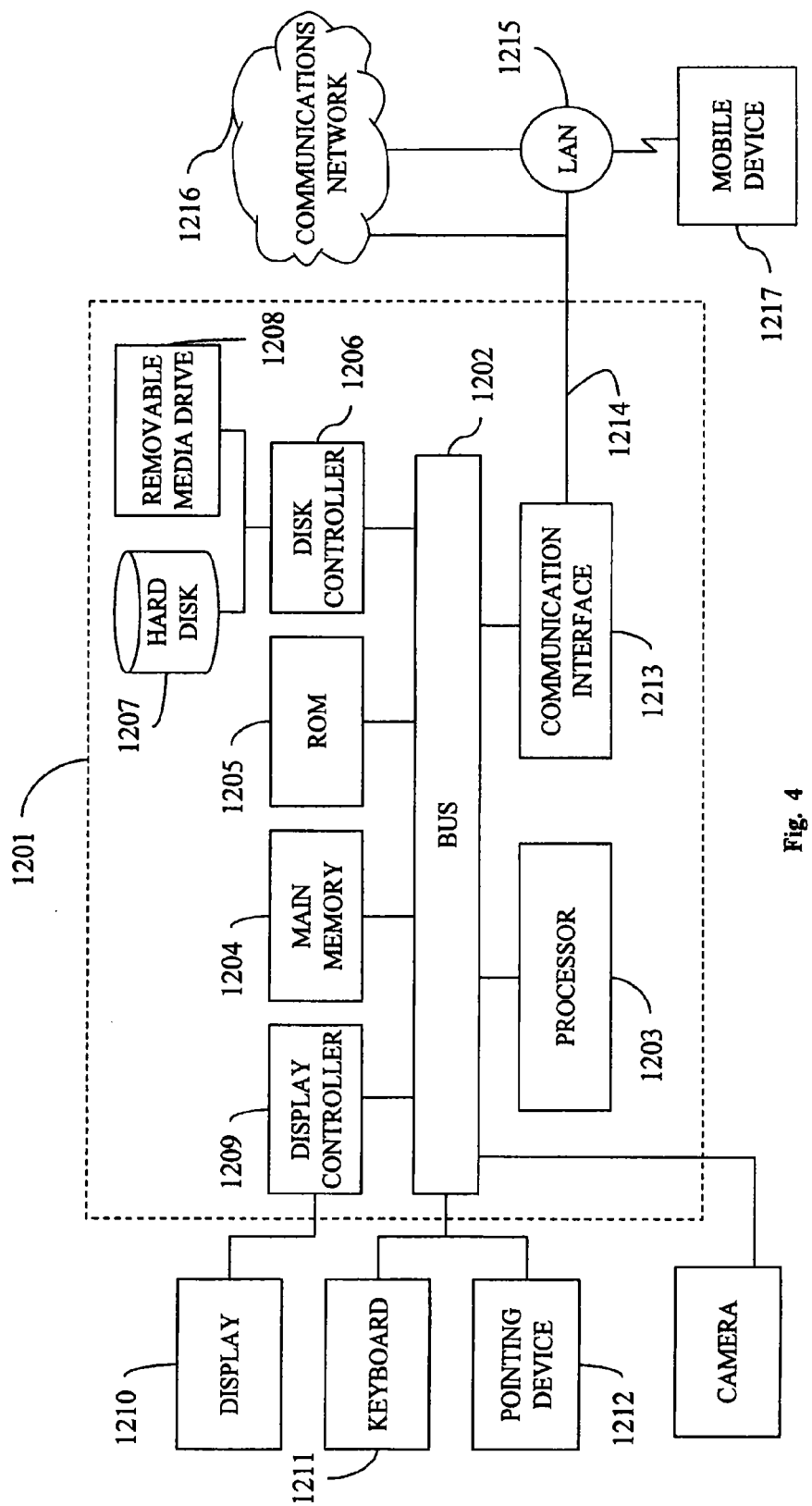
FIG. 4 illustrates the hardware of the server used in embodiments described herein.

FIG. 4 illustrates a computer system (or server) 1201 upon which an embodiment of the W2P server may be implemented on. The computer system 1201 includes a bus 1202 or other communication mechanism for communicating information, and a processor 1203 coupled with the bus 1202 for processing the information. The computer system 1201 also includes a main memory 1204, such as a random access memory (RAM) or other dynamic storage device (e.g., dynamic RAM (DRAM), static RAM (SRAM), and synchronous DRAM (SDRAM)), coupled to the bus 1202 for storing information and instructions to be executed by processor 1203. In addition, the main memory 1204 may be used for storing temporary variables or other intermediate information during the execution of instructions by the processor 1203. The computer system 1201 further includes a read only memory (ROM) 1205 or other static storage device (e.g., programmable ROM (PROM), erasable PROM (EPROM), and electrically erasable PROM (EEPROM)) coupled to the bus 1202 for storing static information and instructions for the processor 1203.

The computer system 1201 also includes a disk controller 1206 coupled to the bus 1202 to control one or more storage devices for storing information and instructions, such as a magnetic hard disk 1207, and a removable media drive 1208 (e.g., floppy disk drive, read-only compact disc drive, read/write compact disc drive, compact disc jukebox, tape drive, and removable magneto-optical drive). The storage devices may be added to the computer system 1201 using an appropriate device interface (e.g., small computer system interface (SCSI), integrated device electronics (IDE), enhanced-IDE (E-IDE), direct memory access (DMA), or ultra-DMA).

The computer system 1201 may also include special purpose logic devices (e.g., application specific integrated circuits (ASICs)) or configurable logic devices (e.g., simple programmable logic devices (SPLDs), complex programmable logic devices (CPLDs), and field programmable gate arrays (FPGAs)).

The computer system 1201 may also include a display controller 1209 coupled to the bus 1202 to control a display 1210, such as a cathode ray tube (CRT), for displaying information to a computer user. The computer system includes input devices, such as a keyboard 1211 and a pointing device 1212, for interacting with a computer user and providing information to the processor 1203. The pointing device 1212, for example, may be a mouse, a trackball, or a pointing stick for communicating direction information and command selections to the processor 1203 and for controlling cursor movement on the display 1210.

The computer system 1201 performs a portion or all of the processing steps in response to the processor 1203 executing one or more sequences of one or more instructions contained in a memory, such as the main memory 1204. Such instructions may be read into the main memory 1204 from another non-transitory computer readable medium, such as a hard disk 1207 or a removable media drive 1208. One or more processors in a multi-processing arrangement may also be employed to execute the sequences of instructions contained in main memory 1204. In alternative embodiments, hardwired circuitry may be used in place of or in combination with software instructions.

As stated above, the computer system 1201 includes at least one non-transitory computer readable medium or memory for holding instructions programmed according to the teachings of the exemplary embodiments discussed herein and for containing data structures, tables, records, or other data described herein. Examples of non-transitory computer readable media are compact discs, hard disks, floppy disks, tape, magneto-optical disks, PROMs (EPROM, EEPROM, flash EPROM), DRAM, SRAM, SDRAM, or any other magnetic medium, compact discs (e.g., CD-ROM), or any other optical medium.

Stored on any one or on a combination of non-transitory computer readable media, exemplary embodiments include software for controlling the computer system 1201, for driving a device or devices for implementing functionality discussed herein, and for enabling the computer system 1201 to interact with a human user. Such software may include, but is not limited to, device drivers, operating systems, development tools, and applications software.

The computer system 1201 also includes a communication interface 1213 coupled to the bus 1202. The communication interface 1213 provides a two-way data communication coupling to a network link 1214 that is connected to, for example, a local area network (LAN) 1215, or to another communications network 1216 such as the Internet. For example, the communication interface 1213 may be a network interface card to attach to any packet switched LAN. As another example, the communication interface 1213 may be an asymmetrical digital subscriber line (ADSL) card, an integrated services digital network (ISDN) card or a modem to provide a data communication connection to a corresponding type of communications line. Wireless links may also be implemented. In any such implementation, the communication interface 1213 sends and receives electrical, electromagnetic or optical signals that carry digital data streams representing various types of information.

The network link 1214 typically provides data communication through one or more networks to other data devices. For example, the network link 1214 may provide a connection to another computer through a local network 1215 (e.g., a LAN) or through equipment operated by a service provider, which provides communication services through a communications network 1216. The local network 1214 and the communications network 1216 use, for example, electrical, electromagnetic, or optical signals that carry digital data streams, and the associated physical layer (e.g., CAT 5 cable, coaxial cable, optical fiber, etc). The signals through the various networks and the signals on the network link 1214 and through the communication interface 1213, which carry the digital data to and from the computer system 1201 may be implemented in baseband signals, or carrier wave based signals. The baseband signals convey the digital data as unmodulated electrical pulses that are descriptive of a stream of digital data bits, where the term "bits" is to be construed broadly to mean symbol, where each symbol conveys at least one or more information bits. The digital data may also be used to modulate a carrier wave, such as with amplitude, phase and/or frequency shift keyed signals that are propagated over a conductive media, or transmitted as electromagnetic waves through a propagation medium. Thus, the digital data may be sent as unmodulated baseband data through a "wired" communication channel and/or sent within a predetermined frequency band, different than baseband, by modulating a carrier wave. The computer system 1201 can transmit and receive data, including program code, through the network(s) 1215 and 1216, the network link 1214 and the communication interface 1213. Moreover, the network link 1214 may provide a connection through a LAN 1215 to a mobile device 1217 such as a personal digital assistant (PDA) laptop computer, or cellular telephone.

While certain embodiments have been described, these embodiments have been presented by way of example only, and are not intended to limit the scope of the inventions. Indeed, the novel methods and systems described herein may be embodied in a variety of other forms. Furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

The invention claimed is:

1. A method comprising:
maintaining, at a server, a list of print shops that participate in an external workflow managed by the server;
receiving, at the server through a network, an order for a variable data campaign defining a plurality of personalized items for end recipients, said order including text and graphics used in the variable data campaign, identifying information of the end recipients that each receive an item of the variable data campaign, and a mapping specification that specifies which graphics correspond to which text for each item of the variable data campaign;
generating, at the server, using the mapping specification, the text and graphics received, and the identifying information of the end recipients, a master file for the items of the variable data campaign, wherein the master file includes a QR code that links to a website and includes, for each of the items, images formed of corresponding text and graphics paired together in accordance with the mapping specification for each of the end recipients of the variable data campaign;
assigning, at the server, the variable data campaign to one or more of the print shops that participate in the external workflow; and
providing, at the server, the one or more print shops with the master file.

2. The method of claim 1, wherein the providing includes providing the one or more print shops with the master file that is a PDF file.

3. The method of claim 1, further comprising:
preflighting, at the server, material received from a customer; and
managing, at the server, inventory of the print shops that participate in the external work flow.

4. The method of claim 1, further comprising:
obtaining, at the server, the QR code that links to the website; and
collecting, at the server, analytics regarding visitors that accessed the website by using the QR code.

5. The method of claim 4, further comprising:
in response to receiving a request from a user at the server for the website, redirecting the user to another website.

6. The method of claim 1, wherein each unit of the variable data campaign is an email or a printed medium.

7. The method of claim 1, further comprising:
collecting, at the server, analytics regarding visitors that accessed the website by using the QR code.

8. A non-transitory computer readable storage medium encoded with instructions, which when executed by a computer causes the computer to execute a method comprising:
maintaining a list of print shops that participate in an external workflow managed by the computer;
receiving an order for a variable data campaign defining a plurality of personalized items for end recipients, said order including text and graphics used in the variable data campaign, identifying information of the end recipients that each receive an item of the variable data campaign, and a mapping specification that specifies which graphics correspond to which text for each item of the variable data campaign;
generating, using the mapping specification, the text and graphics received, and the identifying information of the end recipients, a master file for the items of the variable data campaign, wherein the master file includes a QR code that links to a website and includes, for each of the items, images formed of corresponding text and graphics paired together in accordance with the mapping specification for each of the end recipients of the variable data campaign;
assigning the variable data campaign to one or more of the print shops that participate in the external workflow; and
providing the one or more print shops with the master file.

9. The non-transitory computer readable storage medium of claim 8, wherein
the providing includes providing the one or more print shops with the master file that is a PDF file.

10. The non-transitory computer readable storage medium of claim 8, wherein the method further comprises
preflighting material received from a customer; and
managing inventory of the print shops that participate in the external work flow.

11. The non-transitory computer readable storage medium of claim 8, wherein the method further comprises
obtaining the QR code that links to the website; and
collecting analytics regarding visitors that accessed the website by using the QR code.

12. The non-transitory computer readable storage medium of claim 11, wherein the method further comprises
in response to receiving a request from a user at the server for the website, redirecting the user to another website.

13. The non-transitory computer readable storage medium of claim 8, wherein each unit of the variable data campaign is an email or a printed medium.

14. An apparatus comprising:
a memory that stores computer executable instructions; and
a processor configured to execute the instructions in order to
maintain a list of print shops that participate in an external workflow managed by the apparatus,
receive an order for a variable data campaign defining a plurality of personalized items for end recipients, said order including text and graphics used in the variable data campaign, identifying information of the end recipients that each receive an item of the variable data campaign, and a mapping specification that specifies which graphics correspond to which text for each item of the variable data campaign,
generate, using the mapping specification, the text and graphics received, and the identifying information of the end recipients, a master file for the items of the variable data campaign, wherein the master file includes a QR code that links to a website and includes, for each of the items, images formed of corresponding text and graphics paired together in accordance with the mapping specification for each of the end recipients of the variable data campaign, assign the variable data campaign to one or more of the print shops that participate in the external workflow, and provide the one or more print shops with the master file.

15. The apparatus of claim 14, wherein the master file is a PDF file.

16. The apparatus of claim 14, wherein the processor is further configure to preflight material received from a customer, and manage inventory of the print shops that participate in the external work flow.

17. The apparatus of claim 14, wherein the processor is further configured to obtain the QR code that links to the website, and collect analytics regarding visitors that accessed the website by using the QR code.

18. The apparatus of claim 17, wherein the processor is further configured to in response to receiving a request from a user for the website, redirect the user to another website.

19. The apparatus of claim 14, wherein each unit of the variable data campaign is an email or a printed medium.

* * * * *